United States Patent [19]
Shaver

[11] 4,236,370
[45] Dec. 2, 1980

[54] MOWER WITH TWO SICKLE BARS

[75] Inventor: J. Lyle Shaver, Blue Springs, Mo.

[73] Assignee: Allis-Chalmers Corporation, Milwaukee, Wis.

[21] Appl. No.: 104,182

[22] Filed: Dec. 17, 1979

Related U.S. Application Data

[63] Continuation of Ser. No. 25,563, Mar. 30, 1979, abandoned, which is a continuation of Ser. No. 802,478, Jun. 1, 1977, abandoned.

[51] Int. Cl.³ .............................................. A01D 53/12
[52] U.S. Cl. ......................................... 56/297; 56/259
[58] Field of Search .................. 56/297, 311, 309, 259

[56] References Cited

U.S. PATENT DOCUMENTS

| | | | |
|---|---|---|---|
| 94,918 | 9/1869 | Shaw | 56/297 |
| 105,111 | 7/1870 | Mewes | 56/297 |
| 1,672,363 | 6/1928 | Brown | 56/297 |
| 3,508,388 | 4/1970 | Buchholz | 56/297 |
| 3,577,716 | 5/1971 | McCarty | 56/297 |

*Primary Examiner*—Paul J. Hirsch
*Attorney, Agent, or Firm*—Charles L. Schwab

[57] ABSTRACT

A cutter bar has spaced apart guards projecting forwardly therefrom with shearing edges cooperating with the sickle knife elements secured to two aligned sickle bars. An extension bar is secured to the inboard end of one of the sickle bars which extends in overlying relation to the inboard end of the other sickle bar. The extension carries several inverted knife elements which cooperate with upper shear edges on special guards at the inboard ends of the sickle bars.

6 Claims, 9 Drawing Figures

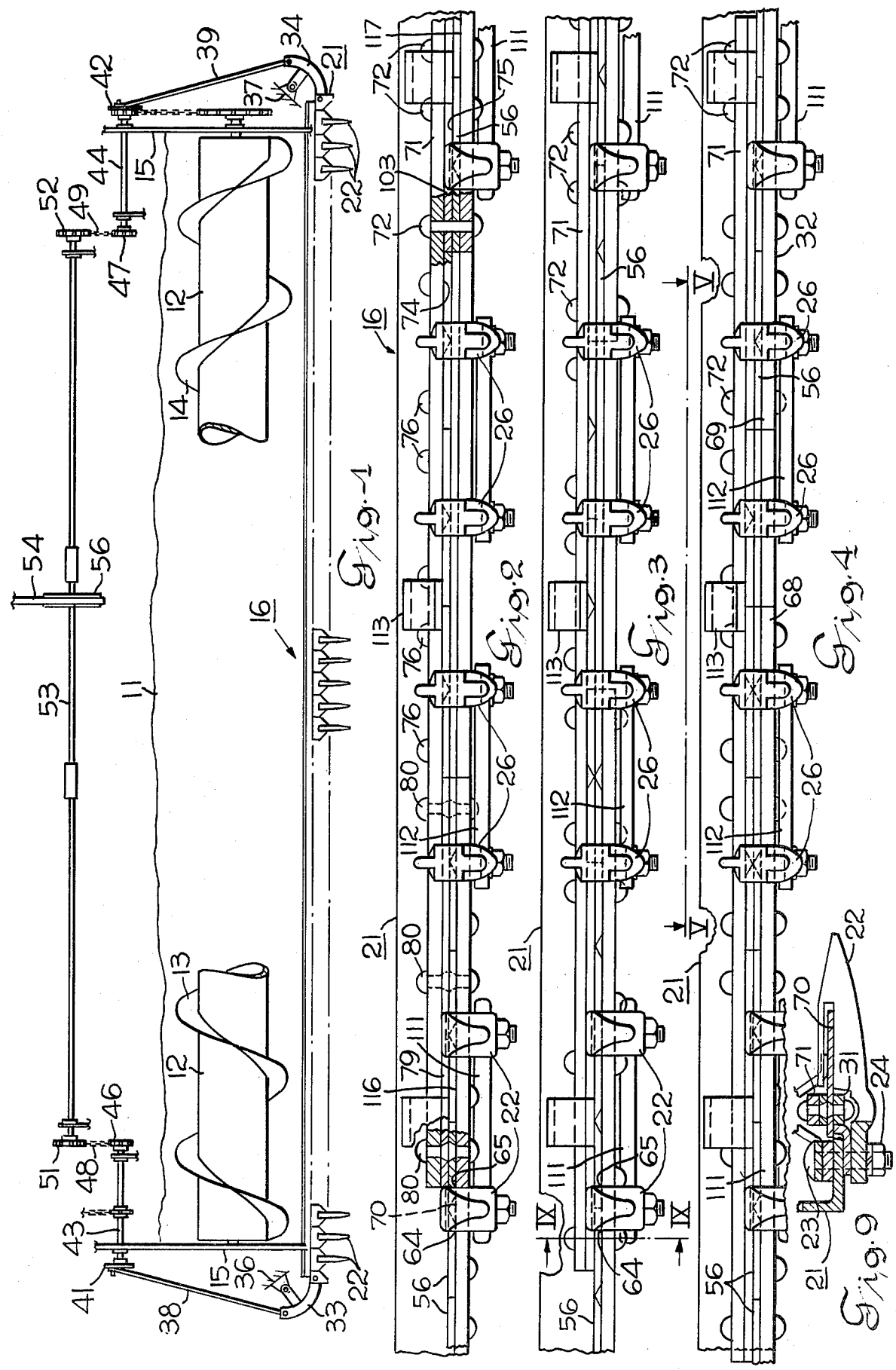

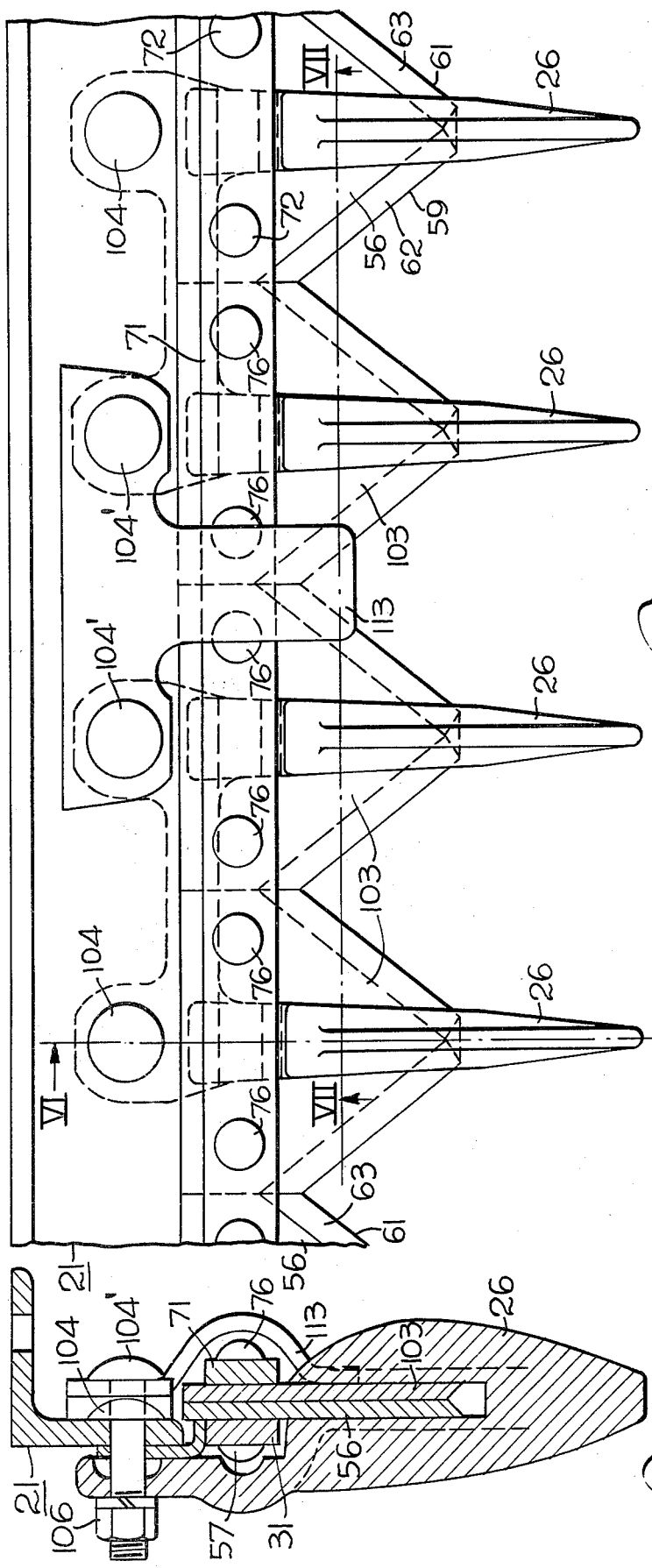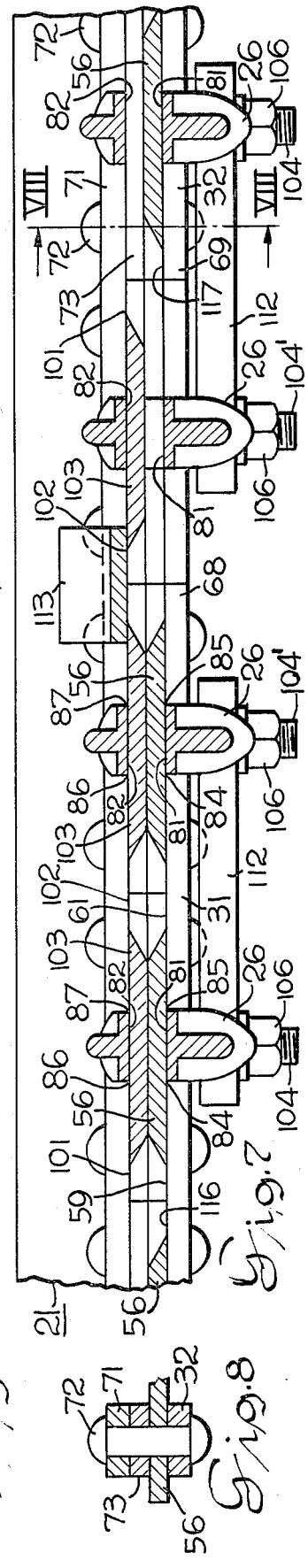

MOWER WITH TWO SICKLE BARS

This is a continuation, application Ser. No. 25,563, filed Mar. 30, 1979 now abandoned, which is a continuation of Ser. No. 802478, filed June 1, 1977, now abandoned.

PRIOR ART STATEMENT

Heretofore, others have attempted to reduce lateral vibration in a mower by using two aligned sickle bars. For instance U.S. Pat. No. 3,508,388 illustrates such an attempt wherein the guard at the inboard ends of the sickle bars carries an oversized ledger plate. This prior art design is believed to not be satisfactory because the inboard edges of the inboard sickle knives do not have sharpened edges and hence do not act as totally effective cutting elements in the inboard stroke of the sickle bars. In the double sickle bar arrangement of U.S. Pat. No. 3,577,716, one sickle bar is displaced vertically the thickness of a knife element and special shims are used to adjust the height of the other sickle bar. In this last mentioned patent an overlapping sickle bar extension carrying conventional knife elements on its underside is secured to one sickle bar and the inboard end of the other sickle bar carries an inverted knife element which cooperates with knife elements on the overlapping extension sickle bar to cut crop in the overlapping area of the two sickle bars.

STATEMENT OF THE INVENTION

This invention provides a mowing device for cutting a standing crop which includes a stationary cutter bar secured to a mobile frame and extending transversely therealong. A plurality of substantially uniform length standard knife guards are mounted in transverse alignment on the cutter bar and project forwardly therefrom, each of the standard guards having an upward facing horizontal ledger surface terminating in first and second shearing edges at its transversely opposite ends. First and second conversely reciprocating sickle bars are disposed in generally parallel relation to and forwardly of the cutter bar and are in transverse alignment with their inboard ends terminating in spaced apart relationship at a midportion of the cutter bar. Knife elements are mounted on the upper surface of the sickle bars and cooperable with the first and second shearing edges of the standard guards for the cutting crop. An extension bar is mounted on top of one of the cutter bars adjacent its inboard end and has a portion extending in overlying relation to the inboard end part of the other cutter bar. Inverted knife elements are mounted on the bottom surface of the extension bar in overlying relation to the transverse space between the first and second cutter bars. A plurality of special knife guards are mounted on the midportion of the cutter bar in transverse alignment with each other and with the standard guards and project forwardly from the cutter bar. Each of the special knife guards has upper and lower vertically spaced horizontal ledger surfaces terminating in shearing edges at transversely opposite sides thereof, with the upper ledger surfaces cooperating with the inverted knife elements to cut crop in the space between the inboard ends of the first and second cutter bars.

This invention provides an improved reciprocating sickle bar type cutter for agricultural crops which is suitable for large-capacity, high-speed harvesting equipment. More specifically the cutter or mower includes two reciprocating sickle bars which are in end-to-end alignment, but not connected directly to one another. An extension bar is secured to one of the sickle bars and carries inverted knife elements which cooperate with upper shear edges on the guards disposed in the area of the inboard ends of the sickle bars.

It is an object of the present invention to provide a cutting mechanism which is of great length and which can be operated satisfactorily at relating high speed.

It is a further object of this invention to provide a dual sickle bar cutter mechanism wherein the sickle bars are in alignment and have adjacent but spaced inboard ends at the central part of the header or cutting unit.

It is a further object of the present invention to provide a cutter having two separately driven sickle bars with an extension on one sickle bar overlapping the end of the other sickle bar and carrying inverted knives coacting with upper shear edges on associated guards to shear the crop in the gap between the inboard ends of the sickle bars.

These and other objects and advantages of the present invention will be apparent to those familiar with the art when the following description is read in conjunction with the drawings.

BRIEF DESCRIPTION OF THE DRAWINGS

One embodiment of the present invention is shown in the drawings in which:

FIG. 1 is a top view of a header for a combine with parts broken away for illustration purposes;

FIG. 2 is an enlarged front view of the central portion of the cutting mechanism of the header shown in FIG. 1 and showing the inboard ends of the dual sickle bars in the laterally outer position of their reciprocating strokes;

FIG. 3 is a view similar to FIG. 2 but showing the inboard ends of the reciprocating sickle bars at an intermediate position between their laterally outer and laterally inner positions;

FIG. 4 is a view similar to FIGS. 2 and 3 but showing the inboard ends of the sickle bars in their laterally inner positions;

FIG. 5 is an enlarged partial top view of the cutting mechanism taken along the line V—V in FIG. 4, showing the inboard ends of the sickle bars and an overlying extension;

FIG. 6 is a section view taken along the line VI—VI in FIG. 5;

FIG. 7 is a section view taken along the line VII—VII in FIG. 5;

FIG. 8 is a section view taken along the line VIII—VIII in FIG. 7; and

FIG. 9 is a section view taken along the line IX—IX in FIG. 3.

DETAILED DESCRIPTION OF THE DRAWINGS

Referring to FIG. 1, the present invention is shown incorporated in a crop header 11 for combine which is suitable for cutting small grain. The header 11 includes an auger mechanism 12 which includes oppositely pitched flights 13, 14 which serve to convey the cut crop laterally inward to a central part of the header from whence the cut crop is conveyed rearwardly and upwardly to the threshing mechanism by the coveying apparatus, not shown. The standing crop of ripened grain is severed by a cutting mechanism 16 which includes a transversely extending, stationary cutter bar 21 which is rigidly secured to the front end of a frame 15 of the header 11. A plurality of substantially uniform length, standard knife guards 22 are mounted in transverse alignment on the cutter bar 21, as illustrated in FIG. 9, by bolts 23 and nuts 24 so as to project forwardly from the cutter bar. Special knife guards 26 mounted on the central portion of the cutter bar 21 are of novel construction as will hereinafter be described.

A pair of sickle bars 31, 32 are disposed in generally parallel relation to and forwardly of the cutter bar 21. The sickle bars 31, 32 are in end-to-end transverse alignment and have their outboard ends pivotally connected to levers 33, 34, respectively, which are pivotally mounted to brackets 36, 37 on the frame 15 of the header 11. The sickle bars 31, 32 are caused to conversely reciprocate by rods 38, 39 connected at their forward ends to levers 33, 34 and at their rear ends to crank arms 41, 42 secured to aligned drive shafts 43, 44. The drive shafts 43, 44 carry sprockets 46, 47 at their inboard ends which are driven by a pair of drive chains 48, 49. The drive chains 48, 49 are drivingly carried on a pair of sprockets 51, 52 secured to the outboard ends of a drive shaft 53 which is driven by the combine engine, not shown, through a drive train which includes a drive belt 54 engaging a pulley 56 on the drive shaft 53. In the condition of the cutting mechanism shown in FIGS. 1 and 2, the sickle bars 31, 32 are in their laterally outer positions of reciprocation. When the drive shafts 43, 44 are simultaneously rotated 180 degrees, the sickle bars will be moved to their laterally innermost position as illustrated in FIG. 4. FIG. 3 illustrates an intermediate position of reciprocation which is between the laterally outer and the laterally inner positions of the sickle bars.

Knife elements 56 are mounted on the upper surfaces 116, 117 of the sickle bars 31, 32 and are secured thereto by rivets 57. The knife elements 56 are of a generally triangular shape and have a pair of forwardly converging cutting edges 59, 61 at the junction of the bottom surface of the knife element and a pair of sloping edge surfaces 62, 63. The cutting edges 59, 61 on the knife elements 56 cooperate with the shearing edges 64, 65 on the knife guards 22, to sever a standing crop as the combine is driven through the field. The shearing edges 64, 65 are at the transversely opposite ends of an upward facing horizontal ledger surface 70 on each of the standard knife guards 22.

The inboard ends 68, 69 of the sickle bars 31, 32 are spaced from one another thereby leaving a gap between the inboard ends. The gap varies from a distance approximately equal to the spacing of one knife element, as illustrated in FIG. 4, to a distance approximately equal to the spacing of three knife elements. In order to cut the crop in the area of the gap, an extension bar 71 is secured to sickle bar 32 by a plurality of rivets 72. A spacer 73 of the same thickness as the knife element 56 is placed between the extension bar 71 and the knife elements 56 on sickle bar 32 thereby spacing the underside surface 74 of the extension bar vertically above the upper surface 75 of the knife elements 56 a distance equal to the vertical thickness of inverted knife elements 103 secured to the extension bar 71. The inverted knife elements 103, which are of the same construction as knife elements 56, are secured to the extension bar 71 by rivets 76. The extension bar 71 extends laterally inward from the inboard end 69 of the sickle bar 32 across the gap between the inboard ends 68, 69 of the sickle bars 31, 32 and in overlying relation to the inboard end 68 of sickle bar 31. A slide member 79, which is secured to the extension bar 71 by rivets 80, is in sliding engagement with the top surface of the knife elements 56 secured to the inboard end of sickle bar 31. The slide member 79 and spacer 73 are not only of the same vertical thickness as the knife element 56 but are also of the same width as the extension bar 71 and sickle bars 31, 32, as illustrated in FIGS. 8 and 9.

The special knife guards 26, which are transversely aligned with each other and with the standard guards 22, are constructed with two ledger surfaces 81, 82 which are in confronting, vertically spaced relation to one another. Ledger surface 81 is upward facing and terminates in cutting edges 84, 85 at its transversely opposite sides which cooperate with the cutting edges 59, 61 of the knife element 56. The ledger surface 82 is downwardly facing and terminates in cutting edges 86, 87 at its transversely opposite ends. The cutting edges 86, 87 of the special knife guards 26 cooperate with cutting edges 101, 102 on the inverted knife elements 103 to cut crop in the area of the gap between the inboard ends 68, 69 of sickle bars 31, 32. The special knife guards 26 are secured to the cutter bar 21 by bolts 104, 104' and nuts 106.

As is customary in the trade, the transversely aligned knife guards 22, 26 are forged in sets of two with an integral transverse bridge. The bridge for knife guards 22 is indicated by the reference character 111 and the bridge for the special knife guards 26 is indicated by the number 112. A plurality of hold down clips 113 are secured to the cutter bar 21 at laterally spaced intervals therealong.

SUMMARY

As the horizontally aligned sickle bars 31, 32 are conversely reciprocated by the illustrated drive mechanism, their inboard ends 68, 69 move transversely toward and away from one another but are always spaced from one another. The cutting edges 101, 102 of the three inverted knife elements 103, which are identical in construction to knife elements 56, cooperate with the shearing edges 86, 87 of the four special knife guards 26 to cut standing grain or crop in the space between the confronting inboard ends 68, 69 of the sickle bars 31, 32. The sickle bars 31, 32 are in alignment with their top surfaces 116, 117 lying in the same plane. This simplifies the construction of the cutting mechanism 16, as compared with prior art dual sickle cutting mechanisms wherein one sickle bar is displaced vertically relative to the other. The extension bar 71 is spaced above the sickle bars 31, 32 a distance equal to the combined thickness of a knife element 56 and a knife element 103. In order to properly accommodate the double thickness of knife elements in the central gap area the parallel lower and upper horizontal ledger surfaces 81, 82 are vertically spaced from one another, a distance slightly greater than the combined thickness of a knife element 56 and a knife element 103. The slightly greater distance is necessary to insure a relatively free sliding relationship between the ledger surfaces 81, 82 of the special guards 26 and the associated knife elements 56, 103.

It is claimed that:

1. A mowing device comprising in combination:
   a frame structure adapted for forward travel over ground having a standing crop thereon,
   a stationary cutter bar secured to and extending transversely along the front end of said frame structure;

a plurality of substantially uniform length standard knife guards mounted in transverse alignment on said cutter bar and projecting forwardly therefrom, each of said standard guards having an upward facing horizontal ledger surface terminating in first and second shearing edges at its transversely opposite ends, first and second conversely reciprocating sickle bars disposed in generally parallel relation to and forwardly of said cutter bar, said sickle bars being in transverse alignment and having inboard ends terminating in an end to end relationship at a midportion of said cutter bar, the transverse space between said inboard ends varying during reciprocation of said sickle bars, knife elements mounted on the upper surfaces of said first and second sickle bars and cooperable with said first and second edges of said standard guards for cutting crop, an extension bar mounted above and secured to one of said sickle bars at its inboard end and having a portion extending in overlying relation to the inboard end of the other sickle bar, a plurality of inverted knife elements mounted on the bottom surface of said extension bar in overlying relation to said transverse space between said first and second sickle bars, and a plurality of special knife guards mounted on said central portion of said cutter bar in transverse alignment with each other and with said standard guards and projecting forwardly from said cutter bar, each of said special knife guards having upper and lower vertically spaced horizontal ledger surfaces, with shearing edges at transversely opposite sides thereof, said inverted knife elements cooperating with said shearing edges of said upper ledger surfaces to cut crop in said transverse space between the inboard ends of said first and second sickle bars during reciprocation of the latter, said transverse space between said sickle bars being covered by said inverted knife elements in all positions of reciprocation of said sickle bars.

2. The mowing device of claim 1 and further comprising a spacer between the knife elements near the inboard end of said one sickle bar and said extension bar and including means rigidly securing said one sickle bar, spacer, extension bar and the associated knife elements to one another.

3. The mowing device of claim 2 and further comprising a slide member disposed on the underside of the free end of said extension bar and secured thereto for reciprocation therewith, said slide member having a sliding engagement with the top of the knife elements near the inboard end of said other sickle bar.

4. The mowing device of claim 3 wherein said spacer and slide member are of the same vertical thickness as said inverted knife elements.

5. The mowing device of claim 1 wherein there are at least three special knife guards and at least four inverted knife elements.

6. The mowing device of claim 1 wherein said upper and lower ledger surfaces are vertically spaced from one another a distance slightly greater than the combined thickness of one of said knife elements and one of said inverted knife elements.

* * * * *